(12) United States Patent
Belin et al.

(10) Patent No.: US 9,416,250 B2
(45) Date of Patent: Aug. 16, 2016

(54) SEMI-FINISHED PRODUCT AND TIRE COMPRISING A COMPOSITION CONTAINING A CORROSION INHIBITOR

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Lionel Belin, Clermont-Ferrand (FR); Marine Balorin, Clermond-Ferrand (FR); Odile Tadjoa, Clermont-Ferrand (FR); Auriane Frisch, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/759,434

(22) PCT Filed: Jan. 7, 2014

(86) PCT No.: PCT/EP2014/050136
§ 371 (c)(1),
(2) Date: Jul. 7, 2015

(87) PCT Pub. No.: WO2014/108391
PCT Pub. Date: Jul. 17, 2014

(65) Prior Publication Data
US 2015/0337111 A1    Nov. 26, 2015

(30) Foreign Application Priority Data
Jan. 8, 2013 (FR) .................................... 13 50126

(51) Int. Cl.
*C08K 5/098* (2006.01)
*B60C 9/00* (2006.01)
*B60C 1/00* (2006.01)

(52) U.S. Cl.
CPC . *C08K 5/098* (2013.01); *B60C 1/00* (2013.01); *B60C 1/0041* (2013.04); *B60C 9/0007* (2013.04); *B60C 2001/0066* (2013.04)

(58) Field of Classification Search
CPC ....................................................... C08K 5/098
USPC ............................................................ 524/300
See application file for complete search history.

(56) References Cited

U.S. PATENT DOCUMENTS

| | | | | |
|---|---|---|---|---|
| 4,725,340 A * | 2/1988 | De Filippo | ............... | C25D 3/58 205/138 |
| 5,227,425 A | 7/1993 | Rauline | ......................... | 524/493 |
| 5,852,099 A | 12/1998 | Vanel | ............................ | 524/494 |
| 6,420,488 B1 | 7/2002 | Penot | .......................... | 525/332.7 |
| 6,536,492 B2 | 3/2003 | Vasseur | ........................ | 152/450 |
| 7,217,751 B2 | 5/2007 | Durel et al. | ................... | 524/262 |
| 2011/0263761 A1 * | 10/2011 | Matsuda | ................... | B60C 1/00 524/91 |

FOREIGN PATENT DOCUMENTS

| | | |
|---|---|---|
| EP | 0 501 227 A1 | 9/1992 |
| EP | 0 735 088 A1 | 10/1996 |
| JP | 5-177772 | 7/1993 |
| JP | 2002-348575 | 12/2002 |
| JP | 2005-220396 | 8/2005 |
| WO | 00/05300 A1 | 2/2000 |
| WO | 00/05301 A1 | 2/2000 |
| WO | 02/083782 A1 | 10/2002 |
| WO | 03/016387 A1 | 2/2003 |

OTHER PUBLICATIONS

International Search Report dated Apr. 1, 2014, issued by EPO in connection with International Application No. PCT/EP2014/050136.

* cited by examiner

*Primary Examiner* — Kelechi Egwim
(74) *Attorney, Agent, or Firm* — Fitzpatrick, Cella, Harper & Scinto

(57) ABSTRACT

A semi-finished product or tire comprises a metal reinforcing element embedded in a rubber composition comprising a compound of formula (I):

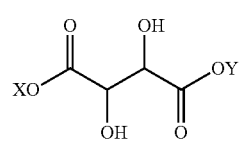

where X and Y represent, independently of one another, an alkali metal or alkaline earth metal cation.

13 Claims, No Drawings

SEMI-FINISHED PRODUCT AND TIRE COMPRISING A COMPOSITION CONTAINING A CORROSION INHIBITOR

FIELD OF THE INVENTION

The invention relates to a semi-finished product and a tyre comprising a composition comprising a corrosion inhibitor, and also to the use thereof.

RELATED ART

A composition for tyres is known from the prior art comprising natural rubber as diene elastomer, carbon black and/or silica as reinforcing filler, a vulcanization system comprising sulphur, and various additives, notably comprising corrosion inhibitors.

The composition is used for the manufacture of semi-finished products comprising metal reinforcing elements, for example metal cords, embedded in the rubber composition. During the use of the tyre, corrosive agents, for example water, may come into contact with the metal reinforcing elements, penetrate them and corrode them, thereby rapidly degrading the mechanical properties thereof and the properties thereof of adhesion to the rubber composition.

The corrosion inhibitor enables, on the one hand, the action of corrosive agents to be prevented by virtue of the formation of a protective film around the metal reinforcing element and, on the other hand, by adsorption onto the metal reinforcing element, enables the corrosive action of corrosive agents on the metal reinforcing element to be slowed or even stopped.

A composition comprising a derivative from the triazine family, as corrosion inhibitor, is known from the document JP05177772. Nevertheless, such a compound is relatively expensive. Moreover, it is desired to limit as far as possible the amount to be used of compounds which may have an impact on the environment.

The aim of the invention is an effective, and environmentally neutral, corrosion inhibitor.

BRIEF DESCRIPTION OF EMBODIMENTS OF THE INVENTION

To this end, a subject of the invention is a semi-finished product comprising a metal reinforcing element embedded in a rubber composition comprising a compound of formula (I):

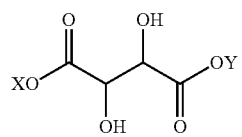

(I)

in which X and Y represent, independently of one another, an alkali metal or an alkaline earth metal cation.

The semi-finished product according to the invention enables the risk of corrosion of the metal reinforcing element to be reduced or even eliminated.

On the one hand, the compounds of formula (I) capture corrosive agents before they reach the metal reinforcing element.

On the other hand, the composition also makes it possible to limit the corrosive action of corrosive agents on the metal reinforcing elements. Indeed, it is assumed that the compounds of formula (I) are transported by the corrosive agent, for example water, and migrate through the composition as far as the metal reinforcing element, where they are adsorbed onto an outer surface of the reinforcing element and block the action of the corrosive agents.

The compounds of formula (I) are commonly called tartrate salts and are relatively neutral with regard to the environment.

In a preferred embodiment, the metal reinforcing element is covered with a layer of copper or brass, which inter alia makes it possible to improve the adhesion of the rubber to the metal reinforcing element by sulphurization of this layer during curing. The compounds of formula (I) do not inhibit this sulphurization and therefore do not adversely affect the adhesion between the metal reinforcing element and the rubber composition.

The composition may be in uncured or vulcanized form.

Examples of semi-finished products are crown reinforcement plies and carcass reinforcement plies.

DETAILED DESCRIPTION OF THE INVENTION

The term rubber composition is understood to mean that the composition comprises at least one elastomer or rubber (the two terms being synonymous) and at least one other component.

In the present description, unless expressly indicated otherwise, all the percentages (%) shown are % by weight. The acronym "phr" stands for parts by weight per hundred parts of solid elastomer.

Preferably, X and Y are chosen from $Na^+$, $K^+$ and $Ca^{2+}$.

In the case where X or Y represents $Ca^{2+}$, it is understood that this cation is shared by two anions, in other words that the amount of ions is equal to twice the amount of cations.

In one embodiment, X=Y.

In another embodiment, X≈Y.

Advantageously, X represents $Na^+$ and Y represents K.

Preferably, the composition comprises at least 0.1 phr, limit included, of the compound of formula (I).

Preferably, the composition comprises at most 2 phr, limit included, preferably at most 1 phr, limit included, and more preferably at most 0.7 phr, limit included, of the compound of formula (I).

Preferably, the composition comprises a diene elastomer.

The term "diene" elastomer or rubber (the two terms being synonymous) is understood in a general way to mean an elastomer derived at least in part (i.e., a homopolymer or a copolymer) from diene monomers (monomers bearing two conjugated or unconjugated carbon-carbon double bonds).

Particularly preferably, the diene elastomer of the composition is selected from the group of diene elastomers consisting of polybutadienes (BR), synthetic polyisoprenes (IR), natural rubber (NR), butadiene copolymers, isoprene copolymers and mixtures of these elastomers. Such copolymers are more preferably selected from the group consisting of styrene-butadiene copolymers (SBR), butadiene-isoprene copolymers (BIR), styrene-isoprene copolymers (SIR), styrene-butadiene-isoprene copolymers (SBIR) and mixtures of such copolymers.

The compositions may contain a single diene elastomer or a mixture of several diene elastomers, the diene elastomer(s) being able to be used in association with any type of synthetic elastomer other than diene elastomers, or even with polymers other than elastomers, for example thermoplastic polymers.

Preferably, the composition comprises a reinforcing filler.

When a reinforcing filler is used, use may be made of any type of reinforcing filler known for its ability to reinforce a rubber composition which may be used for manufacturing tyres, for example an organic filler such as carbon black, an inorganic reinforcing filler such as silica, or else a blend of these two types of filler, notably a blend of carbon black and silica.

All the carbon blacks conventionally used in tyres are suitable as carbon blacks (carbon blacks referred to as tyre-grade). For example, mention will more particularly be made of the reinforcing carbon blacks of the 100, 200 or 300 series (ASTM grades).

In the present patent application, the term "inorganic reinforcing filler" must by definition be understood to mean any inorganic or mineral filler, irrespective of the colour and origin thereof (natural or synthetic), otherwise known as "white" filler, "clear" filler or even "non-black" filler in contrast to carbon black, capable of reinforcing by itself, without any means other than an intermediate coupling agent, a rubber composition intended for the manufacture of tyres, in other words able to replace, in its reinforcing role, a conventional tyre-grade carbon black. Such a filler is generally characterized in a known way by the presence of hydroxyl (—OH) groups at its surface.

The physical state in which the inorganic reinforcing filler is present is unimportant, whether in the form of a powder, of microbeads, of granules, of beads or any other suitable densified form. Of course, inorganic reinforcing filler is also understood to mean mixtures of various inorganic reinforcing fillers, in particular of highly dispersible siliceous and/or aluminous fillers as described below.

Mineral fillers of the siliceous type, in particular silica ($SiO_2$), or of the aluminous type, in particular alumina ($Al_2O_3$), are notably suitable as inorganic reinforcing fillers. The silica used may be any reinforcing silica known to those skilled in the art, notably any precipitated or fumed silica having a BET specific surface and a CTAB specific surface both less than 450 $m^2/g$, preferably from 30 to 400 $m^2/g$. By way of example of highly dispersible precipitated silicas (termed "HDS"), mention will be made of the "Ultrasil" 7000 and "Ultrasil" 7005 silicas supplied by Evonik, the "Zeosil" 1165MP, 1135MP and 1115MP silicas supplied by Rhodia, the "Hi-Sil" EZ150G silica supplied by PPG, the "Zeopol" 8715, 8745 and 8755 silicas supplied by Huber and the silicas with a high specific surface as described in patent application WO 03/16837.

In order to couple the inorganic reinforcing filler to the diene elastomer, an at least bifunctional coupling agent (or bonding agent), intended to ensure a satisfactory chemical and/or physical connection between the (surface of the particles of the) inorganic filler and the diene elastomer, in particular bifunctional organosilanes or polyorganosiloxanes, is used in a known way.

Those skilled in the art will understand that a reinforcing filler of another nature, notably organic, might be used as a filler equivalent to the inorganic reinforcing filler described in the present paragraph, as long as this reinforcing filler is covered with an inorganic layer such as silica, or else has functional sites, notably hydroxyl sites, at the surface thereof, entailing the use of a coupling agent in order to establish the bond between the filler and the elastomer.

The content of total reinforcing filler (carbon black and/or inorganic reinforcing filler such as silica) is within a range from 5 to 120 phr, limits included, more preferably from 5 to 70 phr, limits included, and more preferably also from 5 to 60 phr, limits included.

Of course, it is also possible to use just one carbon black or a blend of several carbon blacks of different ASTM grades. The carbon black may also be used in a blend with other reinforcing fillers and in particular inorganic reinforcing fillers such as those described above, and in particular silica. It will thus be possible to use just one silica or a blend of several different silicas.

When an inorganic filler (for example silica) is used in the composition, alone or in a blend with carbon black, the content thereof is within a range from 0 to 70 phr, limits included, preferably from 0 to 60 phr, limits included, in particular also from 5 to 70 phr, limits included, and even more preferably this proportion varies from 5 to 60 phr, limits included.

Preferably, the composition comprises a reinforcing filler comprising predominantly, by weight, silica and more preferably comprising only silica. Predominantly is understood to mean that the proportion by weight of silica is greater than the proportion by weight of the remainder of the other reinforcing fillers of the composition, whether these fillers are organic, such as for example carbon black, or inorganic.

Advantageously, the composition comprises at least 30 phr, limit included, and preferably at least 40 phr, limit included, of silica.

Preferably, the composition comprises various additives.

The compositions may also comprise all or some of the usual additives customarily used in elastomer compositions intended for the manufacture of tyres, such as for example plasticizers or extending oils, whether the latter are aromatic or non-aromatic in nature, pigments, protecting agents such as antioxidants, antifatigue agents, reinforcing resins such as bismaleimides, and methylene acceptors (for example phenolic novolac resin) or methylene donors (for example HMT or H3M).

As presented above, a corrosion inhibitor in accordance with the formula (I) is used.

Preferably, the composition comprises a crosslinking system, more preferably a vulcanization system.

The crosslinking system, in this case the vulcanization system, comprises sulphur donors, for example sulphur.

Preferably, the vulcanization system comprises vulcanization activators such as zinc oxide and stearic acid.

Preferably, the vulcanization system comprises an accelerator.

Advantageously, the accelerator is selected from tetrabenzylthiuram disulphide (abbreviated to "TBZTD") and the family of the sulphenamides consisting of 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazole-sulphenamide (abbreviated to "TBBS"), N-tert-butyl-2-benzothiazolesulphenimide (abbreviated to "TBSI") and mixtures of these compounds.

Optionally, the vulcanization system also comprises a vulcanization retarder such as N-(cyclohexylthio)phthalimide (abbreviated to "CTP").

The sulphur or sulphur donor is used at a preferred content of between 0.5 and 10 phr, limits included, more preferably of between 0.5 and 8.0 phr, limits included, and very preferably between 2.0 and 8.0 phr, limits included. All the vulcanization accelerators, retarders and activators taken together are used at a preferred content of between 0.5 and 15 phr, limits included. The vulcanization activator(s) is(are) used at a preferred content of between 0.5 and 10 phr, limits included.

Another subject of the invention is a tyre comprising a metal reinforcing element embedded in a rubber composition comprising a compound of formula (I):

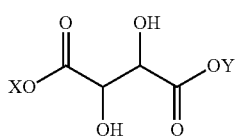

(I)

in which X and Y represent, independently of one another, an alkali metal or alkaline earth metal cation.

The rubber composition in which the metal reinforcing element is embedded is uniform, that is to say identical at every point in the rubber mass.

Yet another subject of the invention is the use of a compound of formula (I):

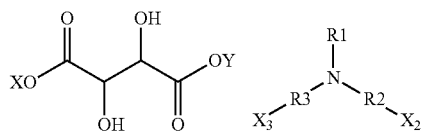

in which X, Y represent, independently of one another, an alkali metal or alkaline earth metal cation, as corrosion inhibitor in a rubber composition in which a metal reinforcing element is embedded.

The characteristics described above relating to the semi-finished product can also apply to the tyre and to the use which are described above.

The invention will be better understood on reading the following description which is given solely by way of non-limiting example.

Comparative Tests

A composition C in accordance with the prior art known to those skilled in the art, devoid of corrosion inhibitor, and compositions 1 to 6 of semi-finished products or of tyres in accordance with the invention were compared.

The amounts of the components of the compositions C and 1 to 6 of the semi-finished products or of tyres according to the invention are compiled in Table 1 below and are expressed in parts per 100 parts by weight of elastomer (phr).

TABLE 1

| Composition | C | 1 | 2 | 3 | 4 | 5 | 6 |
|---|---|---|---|---|---|---|---|
| X | / | $Na^+$ | $Na^+$ | $Na^+$ | $K^+$ | $K^+$ | $Ca^{2+}$ |
| Y | / | $K^+$ | $Na^+$ | $Na^+$ | $K^+$ | $K^+$ | $Ca^{2+}$ |
| Diene elastomer | 100 | 100 | 100 | 100 | 100 | 100 | 100 |
| Carbon black | 4 | 4 | 4 | 4 | 4 | 4 | 4 |
| Silica | 40 | 40 | 40 | 40 | 40 | 40 | 40 |
| Antioxidant | 2 | 2 | 2 | 2 | 2 | 2 | 2 |
| Organosilane | 4 | 4 | 4 | 4 | 4 | 4 | 4 |
| ZnO | 8 | 8 | 8 | 8 | 8 | 8 | 8 |
| Stearic acid | 1 | 1 | 1 | 1 | 1 | 1 | 1 |
| Sulphur | 6 | 6 | 6 | 6 | 6 | 6 | 6 |
| Accelerator | 1 | 1 | 1 | 1 | 1 | 1 | 1 |
| Retarder | 0.2 | 0.2 | 0.2 | 0.2 | 0.2 | 0.2 | 0.2 |
| Corrosion inhibitor | 0 | 0.5 | 0.2 | 0.4 | 0.2 | 0.4 | 0.3 |

Compositions Tested

Each composition 1 to 6 comprises at least 0.1 phr, limit included, and at most 2 phr, limit included, preferably at most 1 phr, limit included, and more preferably at most 0.7 phr, limit included, of the compound of formula (I).

In the compositions of Table 1, the diene elastomer is natural rubber. The silica is an "HD"-type silica—"Zeosil 1165MP" supplied by Rhodia. The carbon black is of N330 type. The antioxidant is N-(1,3-dimethylbutyl)-N'-phenyl-para-phenylenediamine ("Santoflex 6-PPD" supplied by Flexsys). The organosilane is TESPT ("Si69" supplied by Evonik). The vulcanization accelerator is N-cyclohexyl-2-benzothiazolesulphenamide ("Santocure CBS" supplied by Flexsys). The vulcanization retarder of composition C is N-(cyclohexylthio)phthalimide (CAS No. 17796-82-6). The corrosion inhibitors are available from Sigma-Aldrich.

Preparation of the Compositions Tested

The compositions are manufactured in suitable mixers, using two successive preparation phases well known to those skilled in the art: a first phase of thermomechanical working or kneading (sometimes termed "non-productive" phase) at high temperature, up to a maximum temperature (denoted Tmax) of between 110° C. and 190° C., preferably between 130° C. and 180° C., followed by a second phase of mechanical working (sometimes termed "productive" phase) at a lower temperature, typically less than 110° C., for example between 60° C. and 100° C., during which finishing phase the vulcanization system is incorporated. Such phases have been described, for example, in the abovementioned documents EP 501 227, EP 735 088, WO 00/05300, WO 00/05301 or WO 02/083782.

By way of example, the first (non-productive) phase is carried out in a single thermomechanical step during which firstly all the necessary base constituents (diene elastomer, inorganic reinforcing filler, antioxidant, corrosion inhibitor and coupling agent) are introduced into a suitable mixer such as a normal internal mixer, then, secondly, for example after one to two minutes of kneading, any complementary processing aids and various other additives, except for the vulcanization system, are introduced into said mixer. When the bulk density of the inorganic reinforcing filler is low (general case of the silicas), it may be advantageous to divide up the introduction thereof into two or more parts. A second thermomechanical working step may be added in this internal mixer, after dropping the mixture and intermediate cooling (cooling temperature preferably less than 100° C.), with the aim of subjecting the compositions to a complementary thermomechanical treatment, notably in order to further improve the dispersion, within the elastomer matrix, of the inorganic reinforcing filler and the coupling agent thereof. The total duration of the kneading in this non-productive phase is preferably between 2 and 10 minutes.

After cooling the mixture thus obtained, the vulcanization system is then incorporated at low temperature, generally in an external mixer such as an open mill; everything is then mixed (productive phase) for a few minutes, for example between 5 and 15 minutes.

The final composition thus obtained is then calendered, for example in the form of a sheet or a plaque, or else extruded, for example so as to form a rubber profiled element used to manufacture semi-finished products according to the invention, such as crown reinforcement plies or carcass reinforcement plies, or finished products, such as a tyre according to the invention, in which a metal reinforcing element is embedded in the rubber composition.

Vulcanization (or curing) is carried out in a known way at a temperature generally of between 130° C. and 200° C., preferably under pressure, for a sufficient length of time which may vary for example between 5 and 90 min as a function notably of the curing temperature, of the vulcanization system adopted, of the vulcanization kinetics of the composition being considered or of the size of the tyre.

Adhesion Test

A tearing-out test is carried out, in accordance with standard ASTM D2229, on test specimens comprising metal cords of 2.30NF structure, one portion of which is inserted between two strips made from a rubber composition and another portion of which is left exposed.

The force required to tear out the cord from the two rubber strips is measured. The measurement is carried out for 15 cords. The value retained is the mean of the measurements on these 15 cords. The greater the force value, the stronger the adhesion between the cord and the rubber composition.

If, for the composition tested, the force required for tearing out is greater than the force required for tearing out the cords from the control test specimen, the adhesion of the cords to the rubber composition tested is better than that of the control test specimen and therefore the relative value retained is greater than 100 (the relative value of the control test specimen is equal to 100). Conversely, if, for a given composition, the force required for tearing out is less than the force required for tearing out the cords from the control test specimen, the adhesion of the cords to the rubber composition tested is poorer than that of the control test specimen and therefore the relative value retained is less than 100.

The adhesion test described above is carried out with test specimens vulcanized and/or aged under different conditions A, B, C and D.

Condition A (normal curing) corresponds to a test carried out on a test specimen cured for a duration of less than 1 hour at a temperature of greater than 100° C.

Condition B (wet ageing in the uncured state) corresponds to a test carried out on a test specimen comprising the uncured composition aged for several days at a temperature of greater than 30° C. and at more than 50% relative humidity.

Condition C (ageing under a corrosive atmosphere) corresponds to a test carried out on a test specimen comprising the uncured composition aged for several days in a solution of NaCl.

Condition D (wet ageing in the cured state) corresponds to a test carried out on a test specimen cured for a duration of less than 1 hour at a temperature of greater than 100° C. and aged for several days at a temperature of greater than 30° C. and at more than 50% relative humidity.

The results of the adhesion test under the various conditions have been compiled in Table 2 below.

TABLE 2

|   | C | 1 | 2 | 3 | 4 | 5 | 6 |
|---|---|---|---|---|---|---|---|
| A | 100 | 105 | 100 | 100 | 100 | 100 | 100 |
| B | 100 | 104 | 110 | 108 | 109 | 100 | 105 |
| C | 100 | 110 | 108 | 110 | 110 | 110 | 108 |
| D | 100 | 108 | 100 | 100 | 100 | 100 | 100 |

The compositions of the semi-finished products or of the tyres according to the invention exhibit adhesion performances which are similar, indeed even superior, to composition C of the prior art for the majority of the test conditions. In particular, it should be noted that all the compositions of the semi-finished products or of the tyres according to the invention exhibit adhesion performances under corrosion conditions (condition C) which is superior to that of composition C. The compositions of the semi-finished products or of the tyres according to the invention thus make it possible to inhibit the corrosion created by corrosion agents under the majority of the conditions.

Properties Before Curing

Mooney Plasticity

The Mooney plasticity is carried out, using a consistometer, according to standard ASTM D 1646-99. The measurement of Mooney plasticity is carried out according to the following principle: the generally uncured mixture is moulded in a cylindrical chamber heated to a given temperature, usually 100° C. and in this case 60° C. After preheating for one minute, an L-type rotor rotates within the test specimen at 2 revolutions per minute and the effective torque to sustain this movement is measured after 4 minutes of rotation. The Mooney plasticity (ML 1+4) is expressed in "Mooney units" (MU, with 1 MU=0.83 newton·meter).

Properties after Curing

Tensile Tests

These tensile tests make it possible to determine the elasticity stresses and the properties at break of the rubber compositions. Unless otherwise indicated, they are carried out in accordance with French standard NF T 46-002 of September 1988. The nominal secant modulus (or apparent stress, in MPa) at 10% elongation (denoted MA10), at 100% elongation (denoted MA100) and at 300% elongation (denoted MA300) is measured in second elongation (i.e., after an accommodation cycle at the degree of extension provided for the measurement itself).

The results of the measurements of properties of the "Control" composition and of composition 1 before and after curing have been compiled in Table 3 below. The values of the different properties are shown in relative units (R.U.) in relation to the values of the corresponding properties of composition C. When the value of the property is greater than 100, the value of the property is greater than that of composition C. Conversely, when the value of the property is less than 100, the value of the property is less than that of composition C.

TABLE 3

| Composition | C | 1 |
|---|---|---|
| Properties before curing | | |
| Mooney (R.U.) | 100 | 101 |
| Properties after curing | | |
| MA10 (R.U.) | 100 | 102 |
| MA100 (R.U.) | 100 | 103 |
| MA300 (R.U.) | 100 | 103 |

The Mooney plasticity and the nominal secant moduli at 10%, 100% and 300% of composition 1 are hardly modified in relation to those of composition C.

The invention is not limited to the embodiments described previously.

It will also be possible to provide for the mixing of several corrosion inhibitors.

It will be possible to implement the invention with single threads or else cords, for example single-layer cords, multi-layer cords or strand cords.

It will also be possible to combine the characteristics of different embodiments and variants described or envisaged above, with the proviso that these embodiments and variants are compatible with one another.

The invention claimed is:

1. A semi-finished product comprising a metal reinforcing element embedded in a rubber composition, wherein the rubber composition comprises a compound of formula (I):

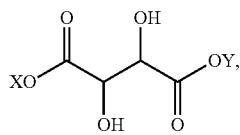

and wherein X and Y represent, independently of one another, an alkali metal cation or an alkaline earth metal cation.

2. The semi-finished product according to claim 1, wherein X and Y are chosen from the group consisting of $Na^+$, $K^+$ and $Ca^{2+}$.

3. The semi-finished product according to claim 1, wherein X and Y are the same.

4. The semi-finished product according to claim 2, wherein X and Y are the same.

5. The semi-finished product according to claim 1, wherein X and Y are different.

6. The semi-finished product according to claim 2, wherein X and Y are different.

7. The semi-finished product according to claim 5, wherein X is $Na^+$ and Y is K.

8. The semi-finished product according to claim 6, wherein X is $Na^+$ and Y is K.

9. The semi-finished product according to claim 1, wherein the rubber composition comprises at least 0.1 phr, limit included, of the compound of formula (I).

10. The semi-finished product according to claim 1, wherein the rubber composition comprises at most 2 phr, limit included, of the compound of formula (I).

11. The semi-finished product according to claim 1, wherein the rubber composition comprises at most 1 phr, limit included, of the compound of formula (I).

12. The semi-finished product according to claim 1, wherein the rubber composition comprises at most 0.7 phr, limit included, of the compound of formula (I).

13. A tire comprising a metal reinforcing element embedded in a rubber composition, wherein the rubber composition comprises a compound of formula (I):

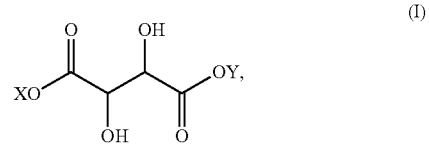

and wherein X and Y represent, independently of one another, an alkali metal cation or an alkaline earth metal cation.

* * * * *